(12) United States Patent
Lee

(10) Patent No.: US 9,258,520 B2
(45) Date of Patent: *Feb. 9, 2016

(54) VIDEO COMMUNICATION TERMINAL AND METHOD OF DISPLAYING IMAGES

(71) Applicant: LG ELECTRONICS INC., Seoul (KR)

(72) Inventor: Eun Young Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 49 days.

This patent is subject to a terminal disclaimer.

(21) Appl. No.: 13/857,920

(22) Filed: Apr. 5, 2013

(65) Prior Publication Data

US 2013/0229481 A1 Sep. 5, 2013

Related U.S. Application Data

(63) Continuation of application No. 11/936,723, filed on Nov. 7, 2007, now Pat. No. 8,489,149.

(30) Foreign Application Priority Data

Apr. 24, 2007 (KR) ........................ 10-2007-0039794

(51) Int. Cl.
  *H04N 7/14* (2006.01)
  *H04N 5/232* (2006.01)
  *G06F 3/14* (2006.01)
  *G09G 5/14* (2006.01)

(52) U.S. Cl.
  CPC .............. *H04N 7/141* (2013.01); *G06F 3/1454* (2013.01); *H04N 5/23293* (2013.01); *G09G 5/14* (2013.01); *G09G 2370/02* (2013.01); *G09G 2370/20* (2013.01)

(58) Field of Classification Search
  USPC ............ 348/14.01, 231.3, 143, 170; 455/566, 455/556.1, 575.1
  See application file for complete search history.

(56) References Cited

U.S. PATENT DOCUMENTS

| 5,786,846 | A  | * | 7/1998  | Hiroaki ....................... 348/14.16 |
| 7,127,271 | B1 |   | 10/2006 | Fujisaki |
| 2001/0004269 | A1 |   | 6/2001  | Shibata et al. |
| 2002/0160724 | A1 | * | 10/2002 | Arai et al. ....................... 455/90 |

(Continued)

FOREIGN PATENT DOCUMENTS

| CN | 1393003 | 1/2003 |
| CN | 1513165 | 7/2004 |

(Continued)

OTHER PUBLICATIONS

European Patent Office Application Serial No. 13002904.4, Search Report dated Jul. 24, 2013, 11 pages.
European Patent Office Application Serial No. 07021733.6, Search Report dated Jun. 23, 2015, 6 pages.

*Primary Examiner* — Amal Zenati
(74) *Attorney, Agent, or Firm* — Lee, Hong, Degerman, Kang & Waimey

(57) ABSTRACT

A mobile terminal includes a communication unit, a display, a camera for obtaining images, and a processor for causing an image to be displayed on the display and for causing images to be communicated via the communication unit. The processor may be further configured to obtain a first image from the camera, obtain a substantial mirror image of the first image to form a second image, display the second image on the display, and communicate the first image to a receiving device via a wireless communication link.

26 Claims, 11 Drawing Sheets

(56) References Cited

U.S. PATENT DOCUMENTS

| | | |
|---|---|---|
| 2003/0065590 A1 | 4/2003 | Haeberli |
| 2003/0117501 A1* | 6/2003 | Shirakawa ................ 348/218.1 |
| 2003/0153363 A1 | 8/2003 | Kuwazoe |
| 2004/0072589 A1* | 4/2004 | Hamamura .......... H04B 1/3833 |
| | | 455/550.1 |
| 2005/0077360 A1 | 4/2005 | Ito et al. |
| 2006/0056837 A1 | 3/2006 | Vapaakoski |
| 2006/0097927 A1* | 5/2006 | Satoh .................... H01Q 1/084 |
| | | 343/702 |
| 2007/0120954 A1 | 5/2007 | Allen et al. |
| 2008/0268899 A1 | 10/2008 | Lee |
| 2009/0202223 A1 | 8/2009 | Saito et al. |

FOREIGN PATENT DOCUMENTS

| | | |
|---|---|---|
| CN | 1518326 | 8/2004 |
| CN | 1708979 | 12/2005 |
| EP | 1441522 | 7/2004 |
| EP | 1549068 | 6/2005 |
| JP | 10-108152 | 4/1998 |
| JP | 2006-041888 | 2/2006 |
| WO | 01/31893 | 5/2001 |
| WO | 2005/025219 | 3/2005 |
| WO | 2006/011401 | 2/2006 |

* cited by examiner

VIDEO COMMUNICATION TERMINAL AND METHOD OF DISPLAYING IMAGES

CROSS-REFERENCE TO RELATED APPLICATIONS

This application is a continuation of U.S. application Ser. No. 11/936,723, filed on Nov. 7, 2007, now U.S. Pat. No. 8,489,149, which claims the benefit of earlier filing date and right of priority to Korean Application No. 10-2007-0039794, filed on Apr. 24, 2007, the contents of which are hereby incorporated by reference herein in their entirety.

FIELD OF THE INVENTION

The present invention generally relates to wireless communications, and in particular, to displaying mirror images on a display of a mobile terminal.

DISCUSSION OF THE RELATED ART

Developments of communication technologies include improvements in the realm of video conferencing. Video conferencing permits two or more parties to communicate with not only audio but with video or images depicting the users or their environment.

A typical communication includes obtaining an image of a first party which is then communicated to a second party for display. In some cases, an image is obtained from the second party and communicated to the first party to display. To optimize the conference experience, it is desirable to center the subject within the image. Some systems display on the transmitting mobile terminal the image which is being transmitted. Even if this feature is provided, users often find it challenging to center themselves within the image since such action requires the user to move the camera relative to the user in a direction which is opposite to that which is depicted in the display. For instance, if the camera is moved to the user's left, the result is that the subject moves from the right of the image to the center of the image, and vice versa. Such action requires unnatural movement of the camera relative to the user

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method for displaying an image on a mobile terminal includes obtaining a first image from a first camera configured with a first mobile terminal, obtaining a substantially mirror image of the first image to a form a second image, displaying the second image on a display associated with the first mobile terminal, and communicating the first image via a wireless communication link to a receiving device.

In one feature, the first camera is user-positionable in a plurality of different positions.

In another feature, the first camera is fixedly configured with the first mobile terminal.

In yet another feature, the first camera is located on the mobile terminal in such a manner as to capture images of a user of the first mobile terminal.

In still yet another feature, the first camera is located on the mobile terminal in such a manner as to capture images of a user of the first mobile terminal while the display is visible to the user.

In one aspect, the first mobile terminal has a first display mode and a second display mode which is user selectable, such that the first display mode comprises displaying the second image on the display associated with the first mobile terminal, and the second display mode comprises displaying the first image, instead of the second image, on the display associated with the first mobile terminal.

In another aspect, the method further includes displaying a display mode menu item on the display of the first mobile terminal, and changing an image display mode of the first mobile terminal between the first display mode and the second display mode responsive to user input with regard to the display mode menu item.

In yet another aspect, the method further includes displaying an icon on the display of the first mobile terminal, and changing an image display mode of the first mobile terminal between the first display mode and the second display mode responsive to user input with regard to the icon.

In still yet another aspect, the method further includes changing an image display mode of the first mobile terminal between the first display mode and the second display mode responsive to user interaction with a key of the first mobile terminal or user contact with the display of the first mobile terminal.

In one feature, the method further includes obtaining a third image from a second camera configured with the first mobile terminal, displaying the third image on the display associated with the first mobile terminal, and communicating the third image via a wireless communication link to the receiving device.

In another feature, the second image and the third image are simultaneously displayed on the display.

In yet another feature, the method further includes obtaining a third image from a second camera configured with the first mobile terminal, displaying the third image as a background image on the display associated with the first mobile terminal, displaying the second image as a foreground image on the display associated with the first mobile terminal, and communicating a combined image including the third image and the first image via a wireless communication link to the receiving device.

In still yet another feature, the method further includes providing relative positioning between the second image and the third image responsive to user input.

In one aspect, the method further includes obtaining a third image from a second camera configured with the first mobile terminal, displaying the third image as a background image on the display associated with the first mobile terminal, displaying the second image as a partially transparent foreground image on the display associated with the first mobile terminal, and communicating a combined image including the third image and the first image via a wireless communication link to the receiving device.

In another aspect, the method further includes obtaining a third image from a second camera configured with the first mobile terminal, displaying the third image as a partially transparent background image on the display associated with the first mobile terminal, displaying the second image as a foreground image on the display associated with the first mobile terminal, and communicating a combined image including the third image and the first image via a wireless communication link to the receiving device.

In yet another aspect, the method further includes obtaining a third image from a second camera configured with the first mobile terminal, displaying the third image as a partially transparent background image on the display associated with the first mobile terminal, displaying the second image as a partially transparent foreground image on the display associated with the first mobile terminal, and communicating a combined image including the third image and the first image via a wireless communication link to the receiving device.

In still yet another aspect, the method further includes receiving a fourth image communicated by a remote device, and displaying the fourth image simultaneously as the second image on the display associated with the first mobile terminal.

In another feature, the mirror image of the first image represents a right-left reverse of the first image.

In accordance with an alternative embodiment, a mobile terminal includes a communication unit, a display, a first camera for obtaining images, and a processor for causing an image to be displayed on the display and for causing images to be communicated via the communication unit. The processor may be configured to obtain a first image from the first camera, obtain a substantial mirror image of the first image to form a second image, display the second image on the display, and communicate the first image to a receiving device via a wireless communication link.

In accordance with yet another alternative embodiment, a mobile terminal includes a communication unit, a display including a first display mode and a second display mode which is user selectable, a first camera for obtaining images and which is located on the mobile terminal in such a manner as to capture images of a user of the mobile terminal while the display is visible to the user, and a processor for causing an image to be displayed on the display and for causing images to be communicated via the communication unit. The processor is configured to obtain a first image from the first camera, obtain a substantial mirror image of the first image to form a second image, display the second image on the display, communicate the first image to a receiving device via a wireless communication link, change display mode of the display responsive to user input, such that the first display mode comprises displaying the second image on the display associated with the mobile terminal, and such that the second display mode comprises displaying the first image, instead of the second image, on the display.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures, wherein.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Various embodiments will be described in conjunction with a mobile terminal capable of performing video communication. However, such teachings apply also to other types of electronic devices. Examples of such devices include laptop computers, desktop computers, portable devices, digital broadcast receiving terminals, MP3 players, personal digital assistants (PDAs), portable multimedia players (PMPs), and the like.

Figure 1A:
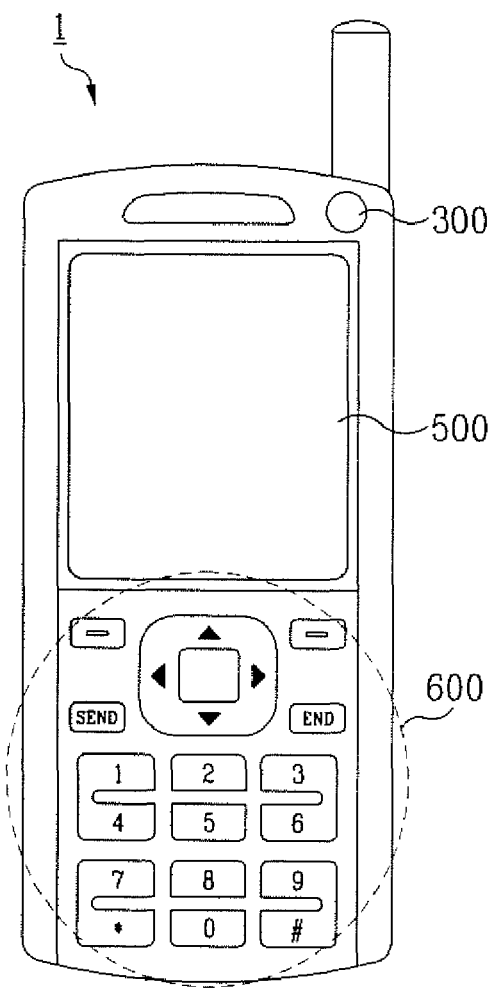
FIGS. 1A and 1B respectively depict front and rear sides of a mobile terminal according to an embodiment of the present invention.
Figure 1B:
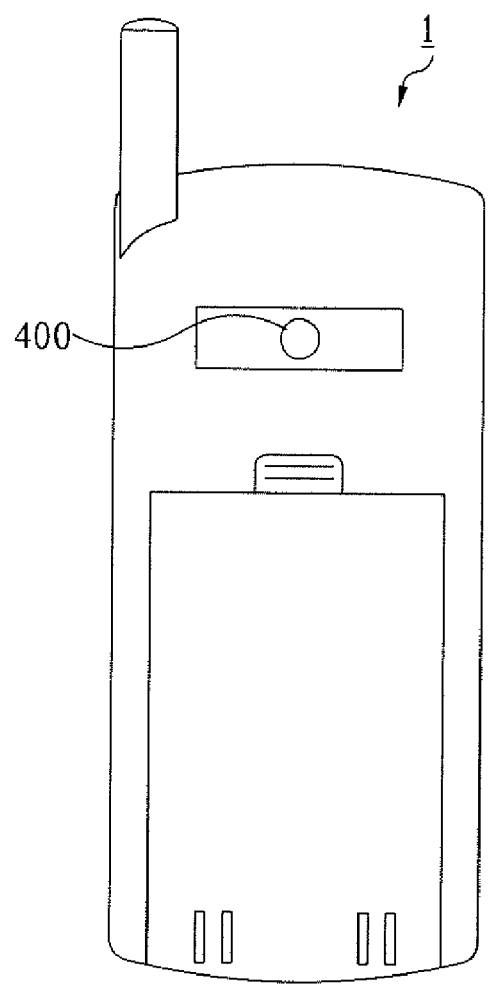
Figure 2:
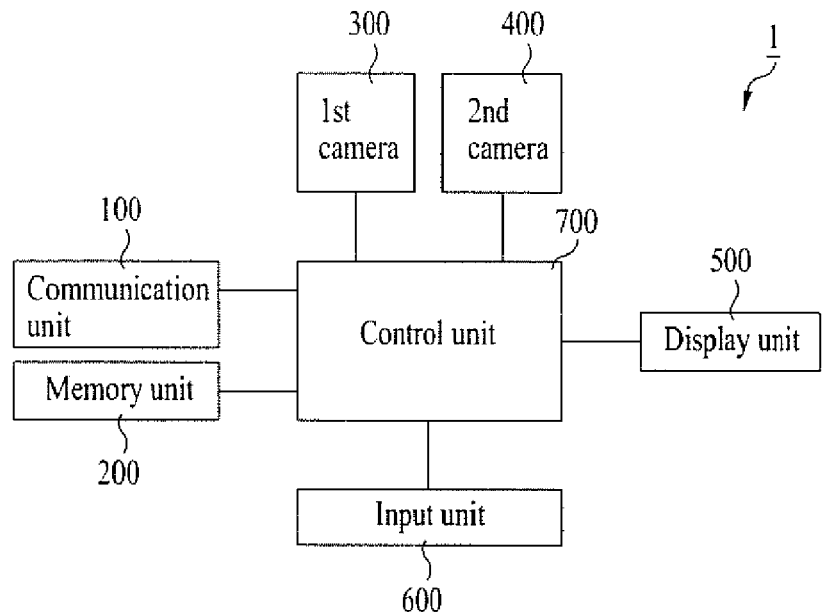
FIG. 2 is a block diagram depicting the mobile terminal of FIGS. 1A and 1B.

FIGS. 1A and 1B respectively depict front and rear sides of a mobile terminal according to an embodiment of the present invention. FIG. 2 is a block diagram depicting the mobile terminal of FIGS. 1A and 1B.

Communication unit 100 facilitates video communication with other users via a mobile communication network. In particular, while a terminal user performs voice communication with another party, the communication unit further or alternatively permits images and/or video obtained by first and second cameras 300, 400, to be transmitted to other parties. In some cases, the communication unit receives images, video, and other data. Certain embodiments will be described herein with regard to either video or images. However, it is understood that such embodiments are not so limited and may implement capturing and/or transmitting media types such as images, video, combinations thereof, and the like.

Memory unit 200 may be used to store various types of data and software for implementing various functions provided by mobile terminal 1. First camera 300 typically includes a lens, and as shown in FIG. 1, may be configured to face the same or similar direction of display 500. In this arrangement, the user may engage in video communication by viewing display 500 while images of the user are captured by first camera 300.

First camera 300 may be fixed or adjustable such that either the camera and/or the camera lens may be adjusted or directed to face one or more directions.

Second camera 400 is typically configured to face a direction which is different from the direction that first camera 300 faces. In an embodiment, such as that which is shown in FIG. 1B, second camera 400 is located on the rear side of mobile terminal 1. Thus, the second camera faces a direction which is opposite to the direction faced by first camera 300, which is located on the front side of the mobile terminal.

This arrangement permits the user to perform a video communication using first camera 300 which obtains images of the user, while second camera 400 obtains images of another location (e.g., scenery which the user is facing during the video communication). If desired, images from both the first and second cameras may be transmitted to the other party with which the user is engaged in the video communication. In an embodiment, images obtained from either the first camera or the second camera are transmitted to other parties.

Display 500 is typically configured to display pictures, video, and other types of information relating to a video conference and other operational aspects of mobile terminal 1. In an embodiment, the display is implemented as a touchscreen which may further permit user input responsive to contact with the touchscreen.

Input unit 600 includes devices which permit user input. By way of nonlimiting example only, the input unit may be configured to include a various input keys, control keys, navigational keys, and the like. Note that some or all of the functionality of the input unit may be implemented in conjunction with a touchscreen display. In this embodiment, some or all of the keys depicted in FIG. 1A may be omitted.

Control unit 700 is typically implemented to control various components associated with mobile terminal 1, such as those which are depicted in FIG. 2.

Single Camera

Figure 3:
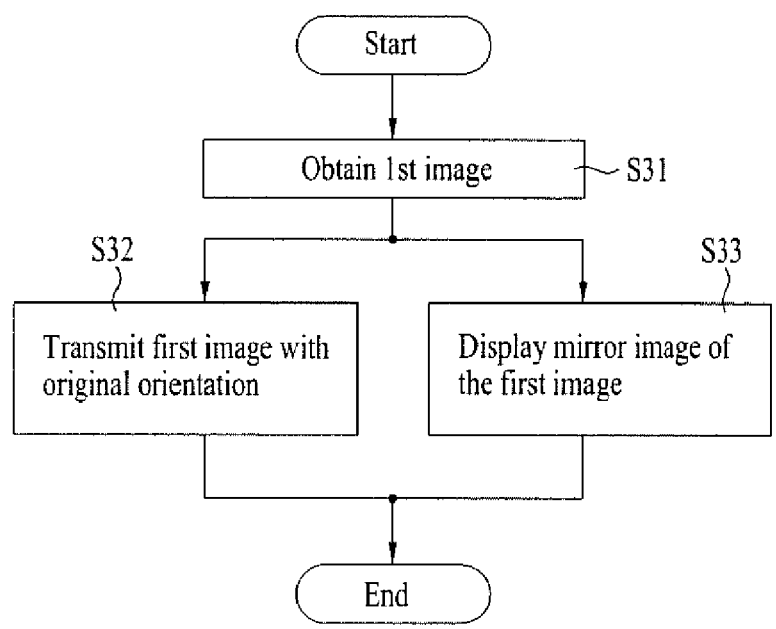
FIG. 3 is a flowchart depicting a method for displaying images obtained from a single camera according to an embodiment of the present invention.

FIG. 3 is a flowchart depicting a method for displaying images obtained from a single camera according to an embodiment of the present invention. In this embodiment, first camera 300 is implemented to obtain the desired images, and thus, second camera 400 is not required.

Block S31 includes obtaining a first image via first camera 300. Block S32 includes transmitting the first image to another party using, for example, the original orientation of the image. That is, the image that is transmitted during this operation does not undergo a right-to-left image reversal, which refers to a mirror image of the orientation of an original image. Block S33 includes displaying a mirror image of the first image.

Implementing the mirror image may be accomplished automatically or responsive to user request. For example, the user may select this function by selecting a certain icon that is displayed on display unit 500 (e.g., using input unit 600 or display unit 500 in the case of a touchscreen). Another alternative is to implement this function responsive to a certain function. An example of the forgoing method will be described with regard to FIG. 4.

Figure 4:
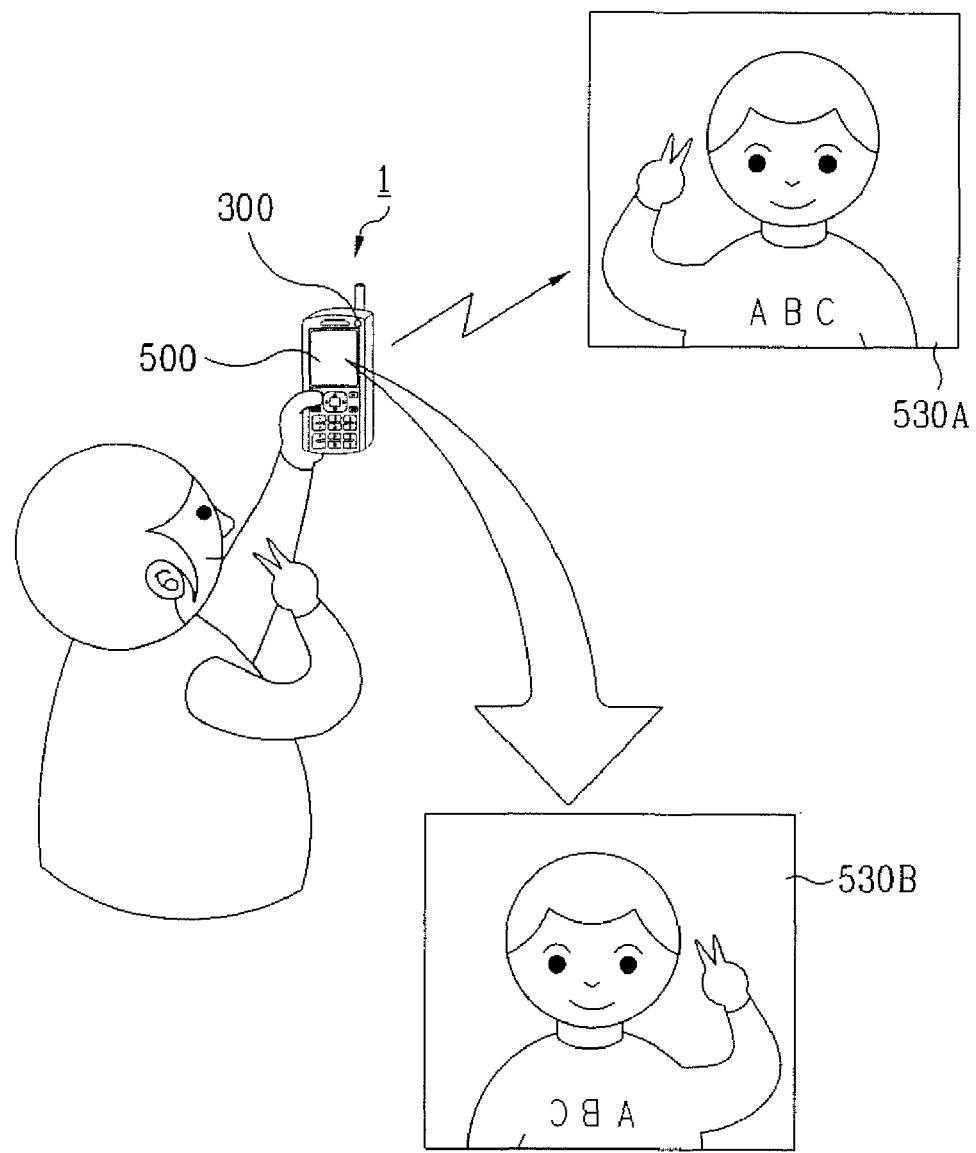
FIG. 4 provides an example in which an image having an original orientation is transmitted to a remote user while a mirror image of the original image is displayed on the mobile terminal of the user.

FIG. 4 provides an example in which an image having an original orientation is transmitted to a remote user while a mirror image of the original image is displayed on the mobile terminal of the user. In particular, the transmitted image is first image 530A, while image 530B is displayed on display 500. Notably, image 530B is a mirror image of first image 530A, which has been obtained by first camera 300. This mirror image is not transmitted to the remote user.

Figure 5A:
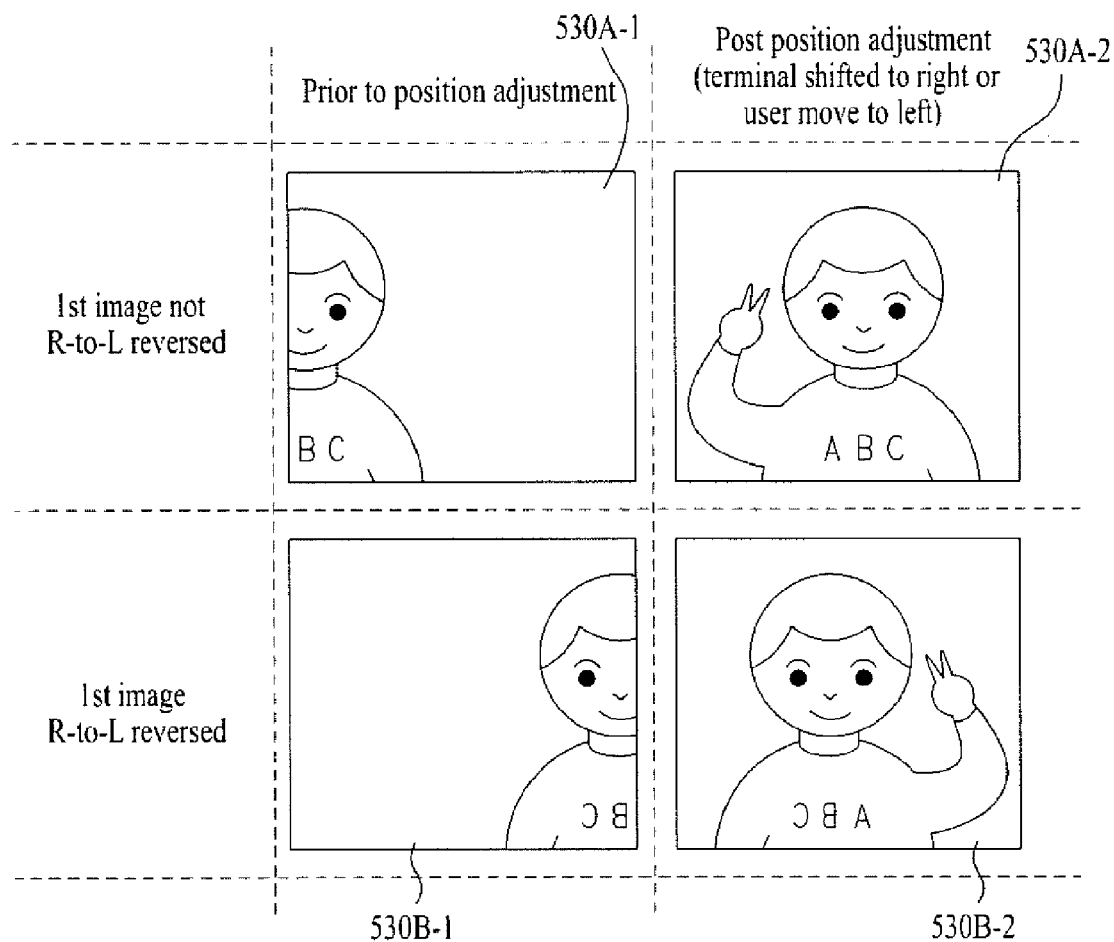
FIGS. 5A and 5B provide examples of obtained images to demonstrate directions for which the mobile terminal is to be positioned relative to a user or other object.
Figure 5B:
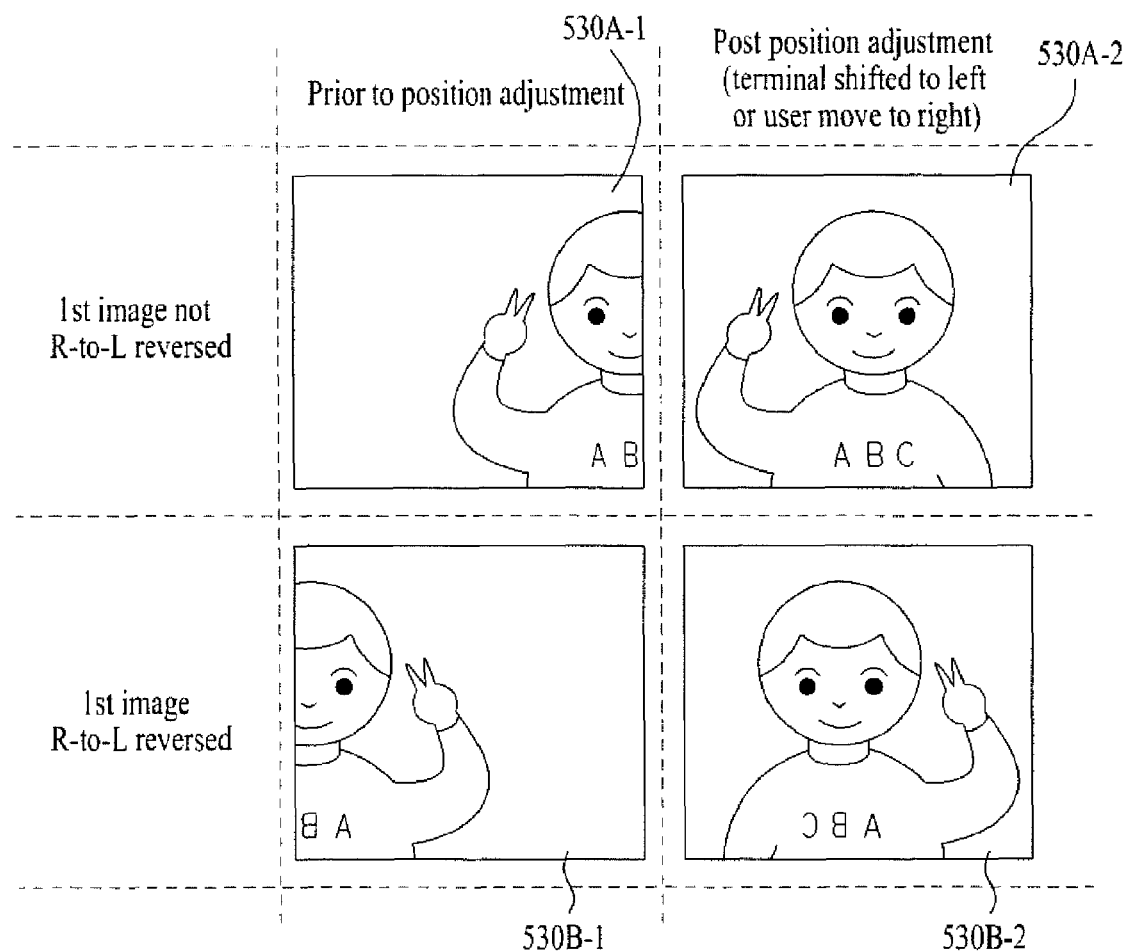

FIGS. 5A and 5B provide examples of obtained images to demonstrate directions for which the mobile terminal is to be positioned relative to a user or other object. In FIG. 5A, the user is located on the left-most side of the image 530A-1. In mirror image, a user is located on the right side of the image, such as that depicted in image 530B-1.

If the first image 530A-1 is not centered in the image, a natural tendency of the user to center the object of the image is to move the terminal to the left (based upon the perspective of the user facing the terminal having the camera). This is similar to movements performed while looking into a mirror. However, such actions will not center the image on the display. To do so, the user will move the terminal to the right to effect centering of the user within the image, such as that which is shown in image 530A-2. Note that various embodiments will be described with regard to moving the terminal or camera relative to the user as a matter of convenience only. However, it is understood that the desired movement may be achieved by effecting relative movement (i.e., moving the terminal, the object being captured, or both) between the terminal and the object being captured.

In accordance with an embodiment, mirror image 530B-1 is presented to a user such that the object of the image (e.g., a user) is located on the right side of the image. When presented with such an image, a user would naturally move the terminal to the right (based upon the perspective of the user facing the terminal having the camera). Consequently, the object of the image is centered within the image, such as that which is depicted in image 530B-2. A notable distinction between techniques used to achieve the centered images of FIG. 5A is that image 530A-2 requires movement by a user which is unnatural, whereas image 530B-2 permits natural movement.

FIG. 5B illustrates the situation in which the user is located on the right-most side of originally orientated image 530A-1. In mirror image, a user is shown located on the left-most side of the image, such as that depicted in image 530B-1. Repositioning the object of each of the images may be obtained in a manner similar to that which is described above in conjunction with FIG. 5A. In particular, centering of the object of image 530A-2 is achieved by moving the terminal to the left (based upon the perspective of the user facing the terminal having the camera). Likewise, with mirror image 530B-1, centering the object of this image is achieved by moving the terminal to the left (based upon the perspective of the user facing the terminal having the camera), such as that which is depicted in image 530B-2.

Figure 6:
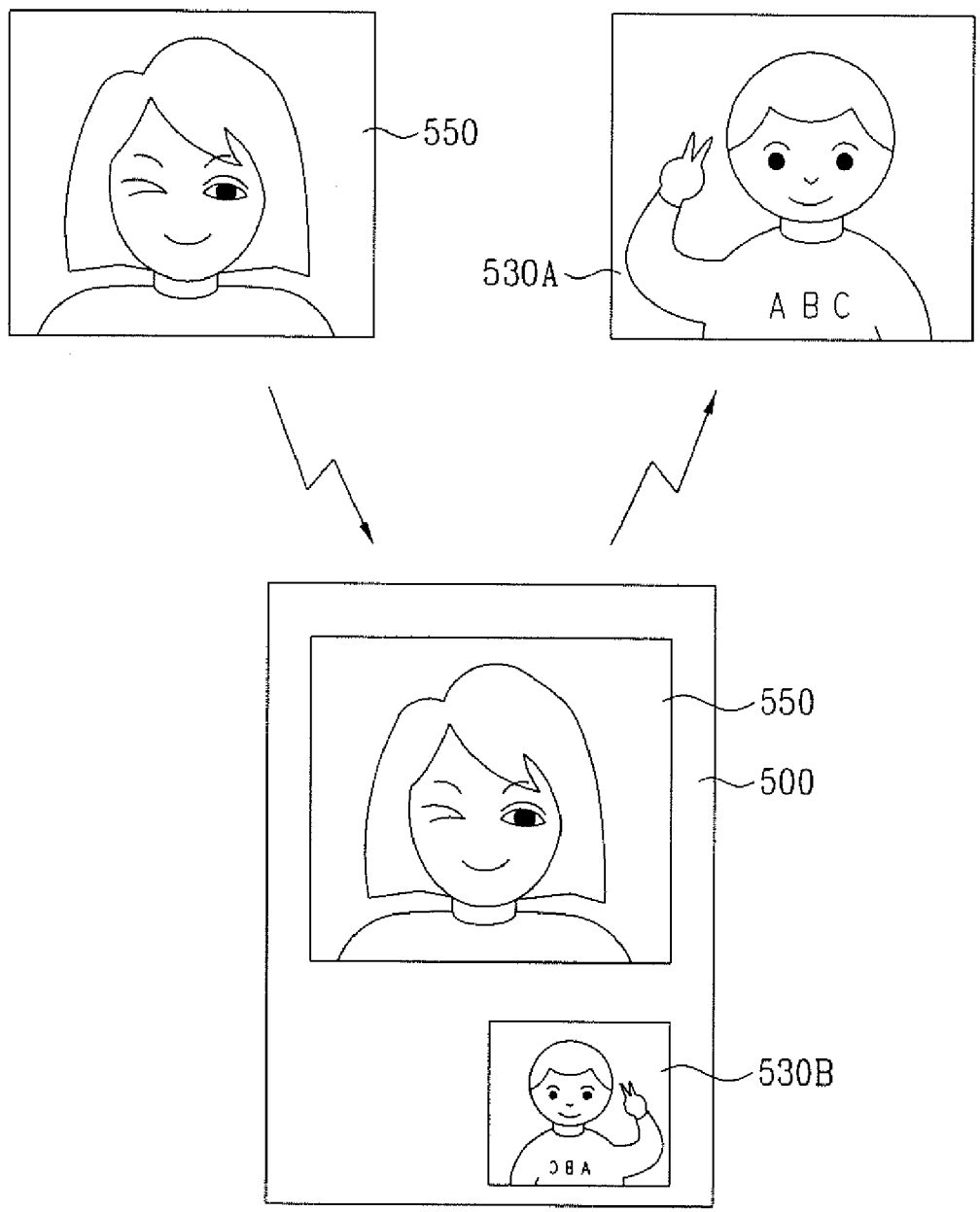
FIG. 6 depicts a display of a typical mobile terminal in accordance with an embodiment of the present invention.

FIG. 6 depicts a display of a typical mobile terminal in accordance with an embodiment of the present invention. In this figure, display 500 includes image 550 which has been received from a remote user during, for example, a video conference. Simultaneously, the user of the mobile terminal communicates image 530A to the remote user. Image 530A includes an original orientation and is an image of the user of the mobile terminal that is obtained by a camera that is associated with the mobile terminal. Display 500 further displays image 530B, which is a mirror image of the original image 530A.

Multiple Cameras

Figure 7:
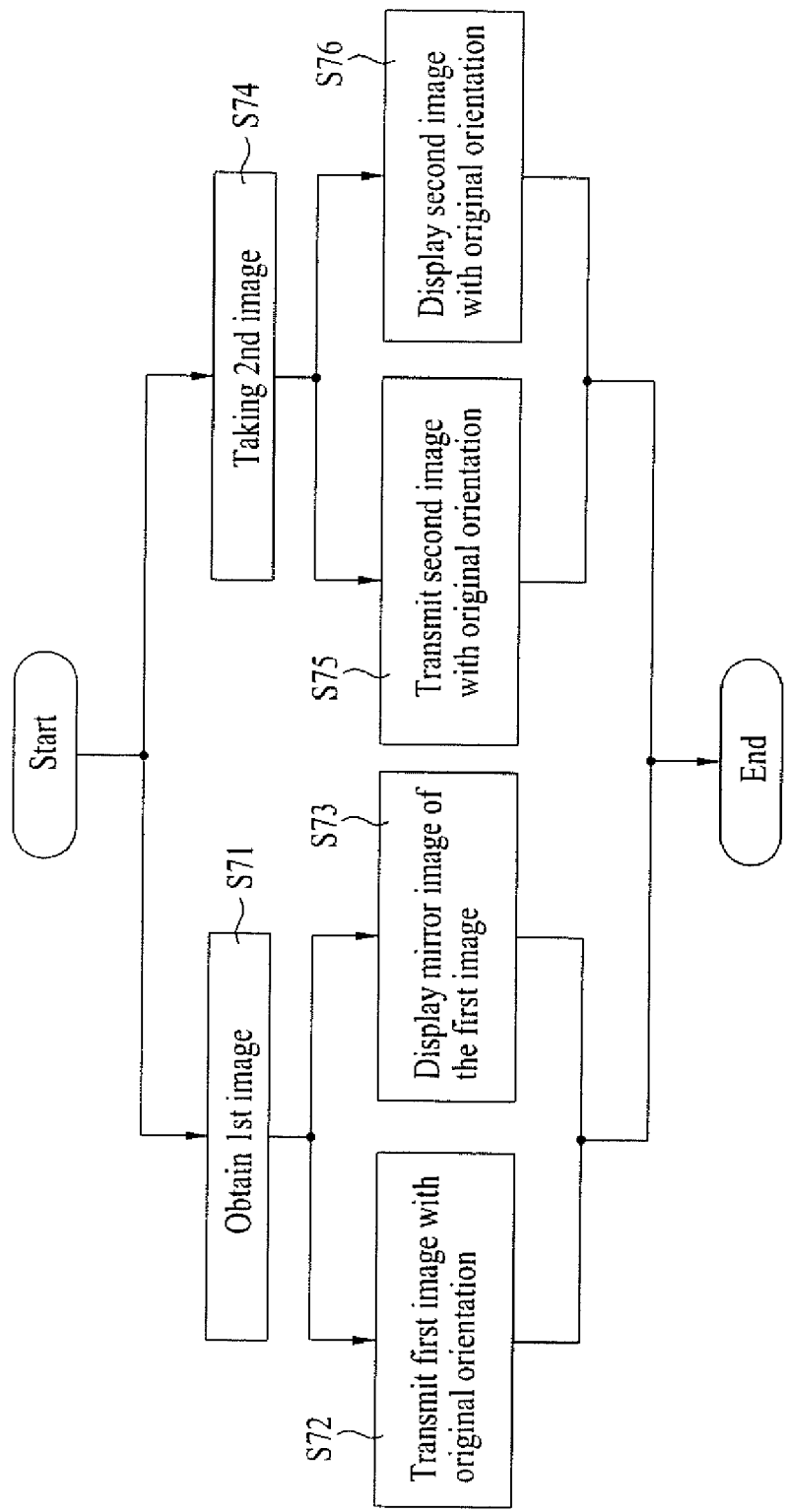
FIG. 7 is a flowchart depicting a method for displaying images according to an embodiment of the present invention.

FIG. 7 is a flowchart depicting a method for displaying images according to an embodiment of the present invention. This embodiment includes obtaining images from first and second cameras 300, 400.

Operations associated with blocks S71, S72, S73, may be implemented using, for example, techniques disclosed in blocks S31, S32, S33 of FIG. 3. Block S74 includes obtaining a second image via second camera 400. Block S75 includes transmitting the second image to another party using, for example, the original orientation of the second image. In particular, the transmitted second image does not undergo a right-to-left image reversal. Block S76 includes displaying the second image.

Figure 8:
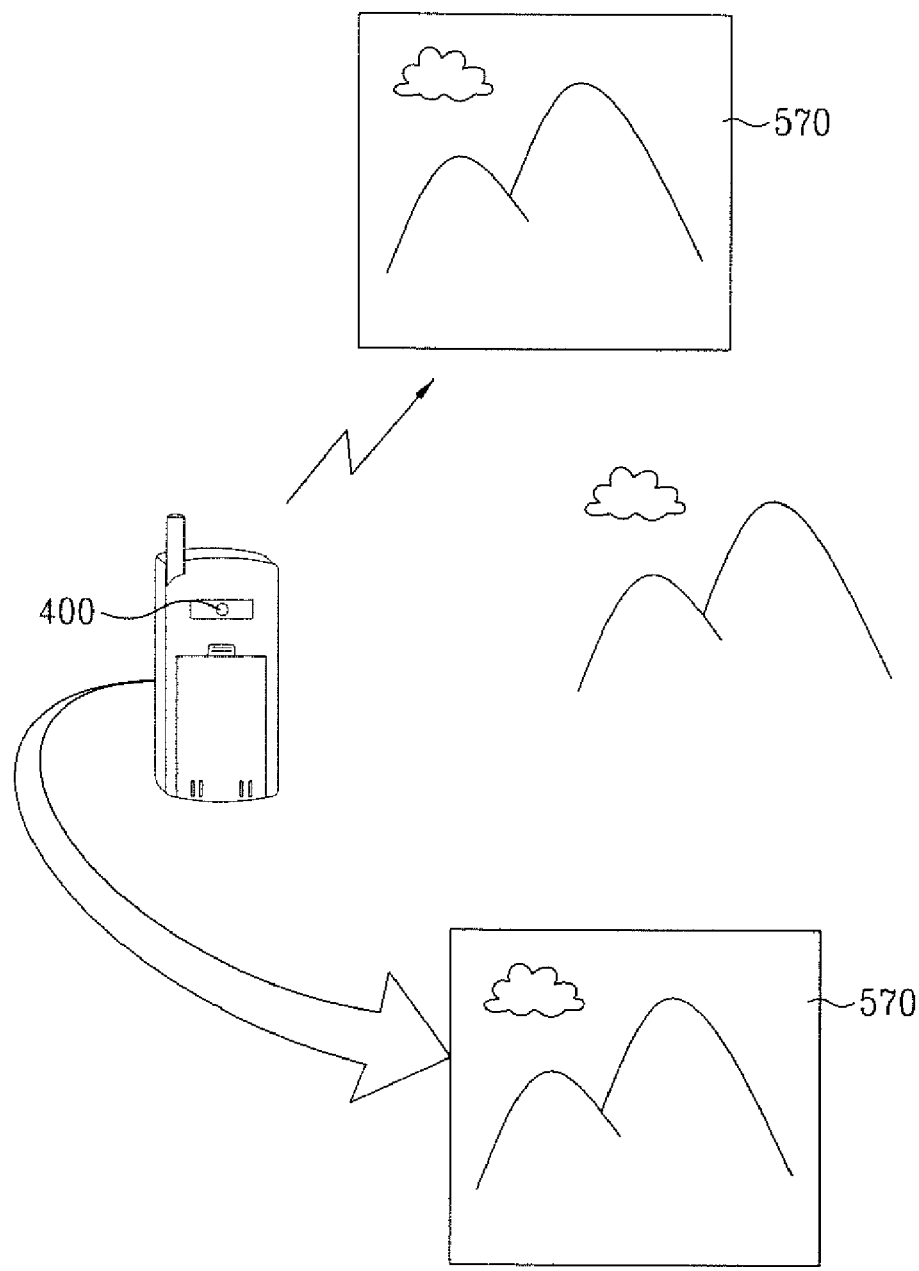
FIG. 8 provides an example in which an image having an original orientation is transmitted to a remote user while the same original image is displayed on the mobile terminal of the user.

FIG. 8 provides an example in which an image having an original orientation is transmitted to a remote user while the same original image is displayed on the mobile terminal of the user. In particular, the transmitted image is first image 570, which may be obtained via second camera 400. This same image may also be displayed on the display of the mobile terminal. This example may be implemented in addition to, or as an alternative to, the other embodiments presented herein.

Figure 9A:
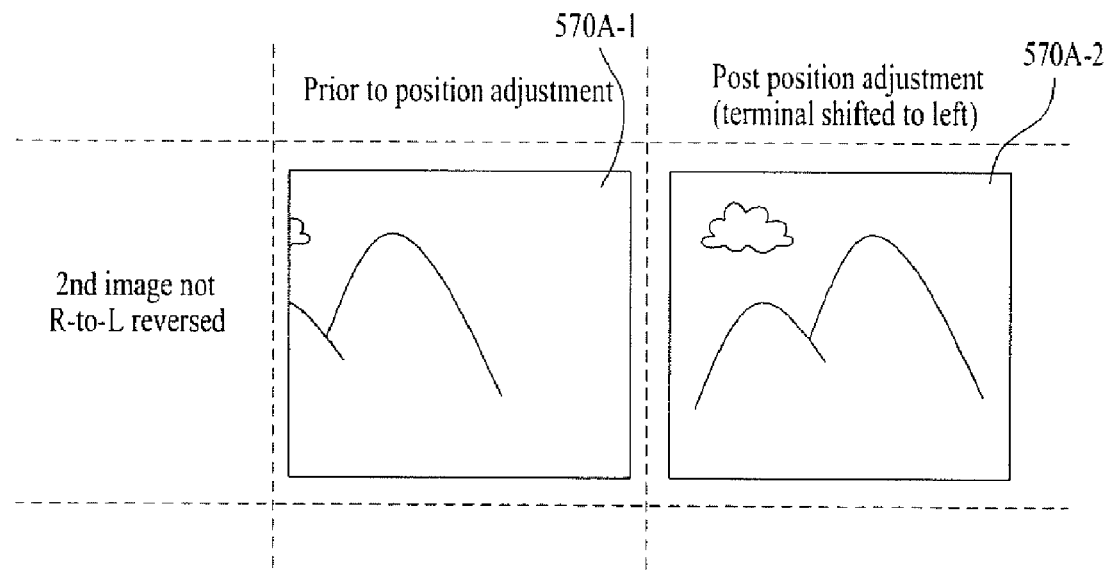
FIGS. 9A and 9B provide examples of images which may be obtained from a second camera configured to face the same direction as the user of the mobile terminal.
Figure 9B:
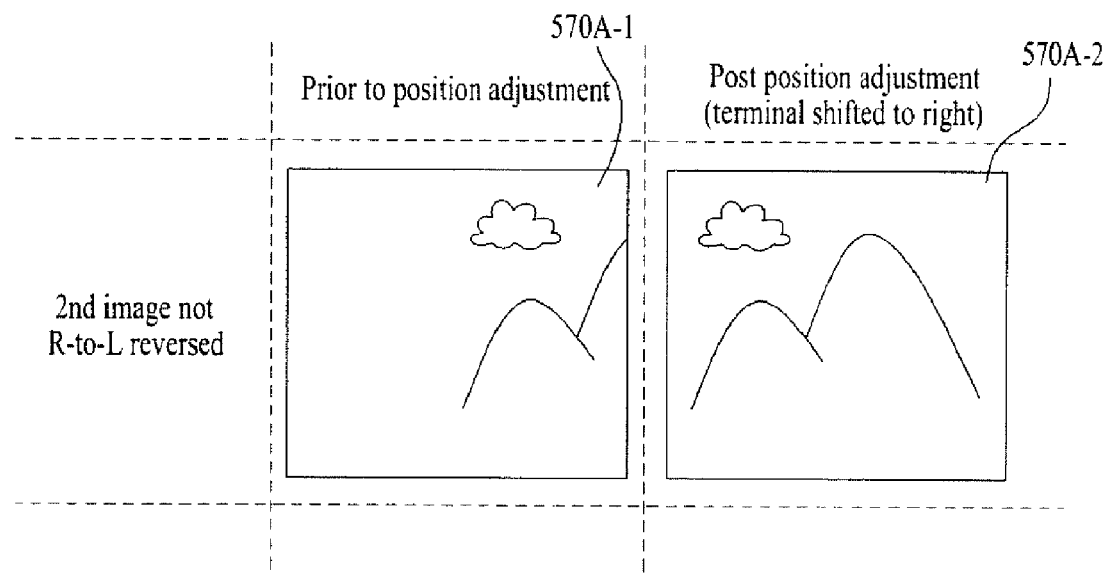

FIGS. 9A and 9B provide examples of images which may be obtained from a second camera configured to face the same direction as the user of the mobile terminal. In both examples, the depicted images are not mirror images of the images which were originally obtained. In FIG. 9A, the user scenery is located on the left-most side of image 570A-1. Centering of the scenery within the image may be obtained by moving the terminal having the second camera to the left. An example of this is depicted in image 570A-2.

FIG. 9B provides the example in which scenery is located on the right-most side of image 570A-1. Centering of the scenery within this image may be obtained by moving the terminal to the right, thus resulting in image 570A-2.

Figure 10:
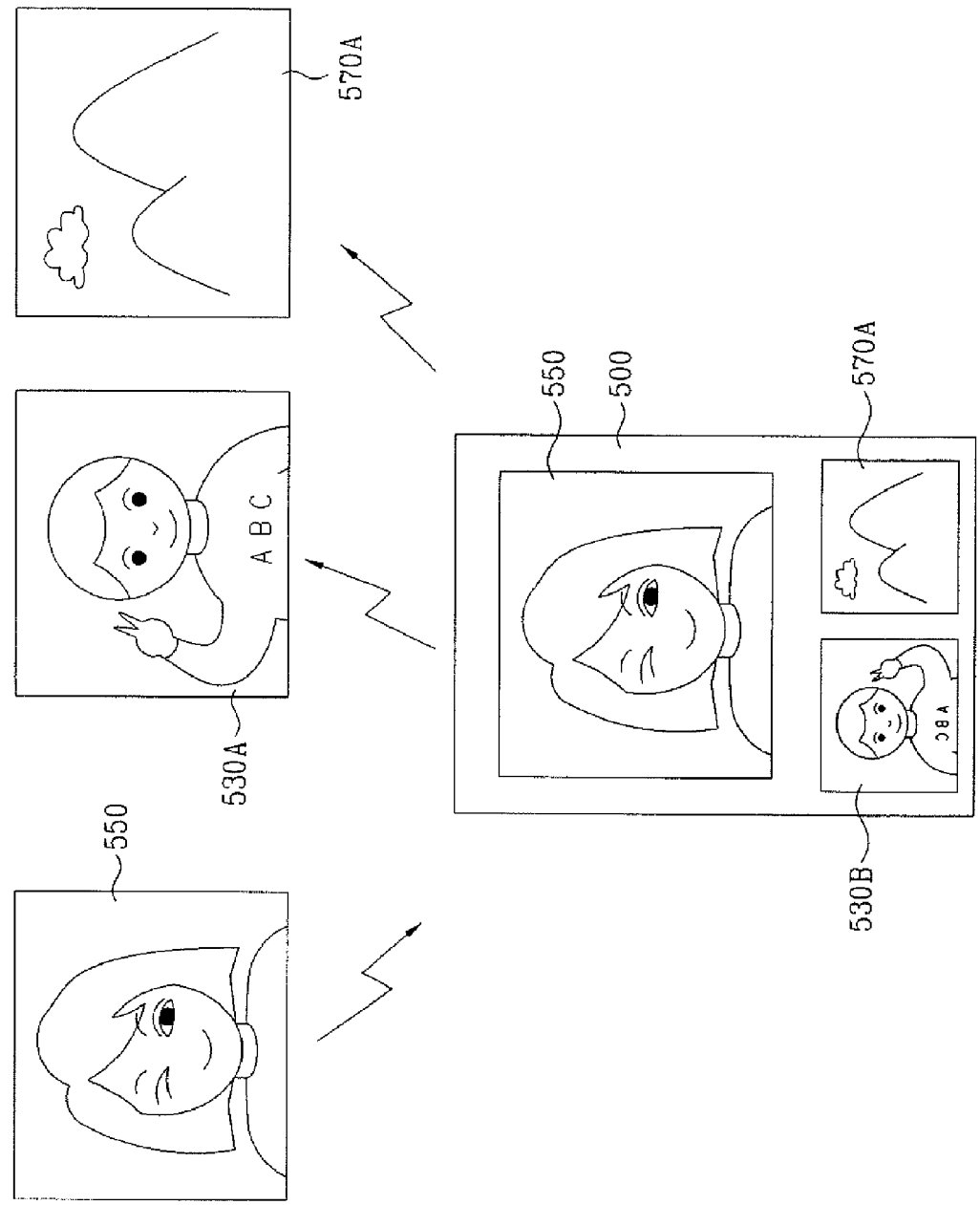
FIG. 10 depicts a display of a mobile terminal according to an embodiment of the present invention.

FIG. 10 depicts a display of a mobile terminal according to an embodiment of the present invention. The mobile terminal is shown receiving image 550 from a remote user, while transmitting to the remote user first image 530A and second image 570A. Image 550 and second image 570A are depicted on display 500 of the mobile terminal. Mirror image 530B, which is the mirror image of first image 530A, is also shown on display 500.

In this embodiment, the user may position themselves in mirror image 530B, as well as positioning the scenery in second image 570A, using natural movements.

If desired, the first image 530A and second image 570A may be overlapped or otherwise combined prior to or after communication to the remote use. This aspect allows the remote user to see the transmitting user in the environment in which they are currently transmitting. A further alternative is to only combine a specific portion of first image 530A (e.g., user's head) with second image 570A. The size and positioning of first image 530A within second image 570A may be defined by the user. As a further example, the first and second images may be overlapped or combined in an opaque or semi-transparent fashion.

Although embodiments of the present invention may be implemented using the exemplary series of operations described herein, additional or fewer operations may be performed. Moreover, it is to be understood that the order of operations shown and described is merely exemplary and that no single order of operation is required.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A display method for a mobile terminal operating in a video call mode, the method comprising:
   obtaining a first video from a first camera configured with the mobile terminal;
   displaying a second video on a display associated with the mobile terminal, wherein the second video is a substantially mirror image of the first video;
   transmitting the first video via a wireless communication link to a receiving device while displaying the second video on the display;
   receiving a third video from the receiving device via the wireless communication link;
   displaying the third video on the display, wherein the second video and the third video are displayed simultaneously on the display;
   obtaining a fourth video from a second camera configured with the mobile terminal; and
   transmitting the fourth video via the wireless communication link to the receiving device, wherein the transmitting of the first video is done separately from the transmitting of the fourth video;
   displaying the fourth video on the display, wherein when the fourth video is displayed, the second video, the third video and the fourth video are simultaneously displayed on the display, wherein the fourth video is displayed as a background video and the second video is displayed as a foreground video; and wherein the mobile terminal comprises a bar-type mobile terminal.

2. The method according to claim 1, wherein the fourth video is obtained while the second video and the third video are displayed on the display.

3. The method according to claim 1, wherein the first camera is located on a front side of the mobile terminal adjacent to the display and is configured to face a same direction as the display, and is fixedly configured with the mobile terminal.

4. The method according to claim 1, further comprising:
   providing relative positioning between at least two of the second video, the third video or the fourth video in response to a user input.

5. The method according to claim 1, wherein at least two of the second video, the third video, or the fourth video are simultaneously displayed on the display and are configured to overlap one another.

6. The method according to claim 1, wherein the mobile terminal has a first display mode and a second display mode, which are user selectable,
   wherein the first display mode comprises displaying the second video on the display; and
   wherein the second display mode comprises displaying the first video, instead of the second video, on the display.

7. The method according to claim 1, wherein the mirror image of the first video represents a right-left reverse of the first video.

8. The method according to claim 1, wherein the second camera is located on a rear side of the mobile terminal, wherein the front side is a side that is opposite to the rear side; and
   wherein the fourth video is different from the first video.

9. A mobile terminal operating in a video call mode comprising:
   a communication unit; a display; a first camera and a second camera for obtaining videos; and a processor configured to: obtain a first video from the first camera;
   cause displaying of a second video on the display, wherein the second video is a substantially mirror image of the first video;
   cause the communication unit to transmit the first video via a wireless communication link to a receiving device while the second video is displayed on the display;

receive, via the communication unit, a third video from the receiving device and via the wireless communication link;

cause displaying of the third video on the display wherein the second video and the third video are displayed simultaneously on the display; obtain a fourth video from the second camera; and cause the communication unit to transmit the fourth video via the wireless communication link to the receiving device, wherein the transmitting of the first video is done separately from the transmitting of the fourth video;

display the fourth video on the display, wherein when the fourth video is displayed, the second video, the third video and the fourth video are simultaneously displayed on the display, wherein the fourth video is displayed as a background video and the second video is displayed as a foreground video; and wherein the mobile terminal comprises a bar-type mobile terminal.

10. The mobile terminal according to claim 9, wherein the fourth video is obtained while the second video and the third video are displayed on the display.

11. The mobile terminal according to claim 9, wherein the first camera is located on a front side of the mobile terminal adjacent to the display and is configured to face a same direction as the display, and is fixedly configured with the mobile terminal.

12. The mobile terminal according to claim 9, wherein the processor is further configured to provide relative positioning between at least two of the second video, the third video or the fourth video in response to a user input.

13. The mobile terminal according to claim 9, wherein at least two of the second video, the third video, or the fourth video are simultaneously displayed on the display and are configured to overlap one another.

14. The mobile terminal according to claim 9, wherein the mobile terminal has a first display mode and a second display mode, which are user selectable, wherein the first display mode comprises displaying the second video on the display; and wherein the second display mode comprises displaying the first video, instead of the second video, on the display.

15. The mobile terminal according to claim 9, wherein the mirror image of the first video represents a right-left reverse of the first video.

16. The mobile terminal according to claim 9, wherein the second camera is located on a rear side of the mobile terminal, wherein the front side is a side that is opposite to the rear side; and wherein the fourth video is different from the first video.

17. A mobile terminal, comprising: a communication unit; a display; a first camera and a second camera for obtaining videos; and a processor for causing at least one video to be displayed on the display and for causing the at least one video to be communicated via the communication unit, wherein the processor, during a video communication, is configured to: obtain a first video from the first camera; obtain a third video from a receiving device via the communication unit; obtain a fourth video from the second camera; simultaneously display a second video, the third video and the fourth video on the display, wherein the second video is a substantially mirror image of the first video;

transmit the first video to the receiving device via a wireless communication link; and transmit the fourth video to the receiving device via the wireless communication link, wherein the first camera is configured to face a direction which is different from a direction that the second camera faces, wherein the transmitting of the first video is done separately from the transmitting of the fourth video;

display the fourth video on the display, wherein when the fourth video is displayed, the second video, the third video and the fourth video are simultaneously displayed on the display, wherein the fourth video is displayed as a background video and the second video is displayed as a foreground video; and wherein the mobile terminal comprises a bar-type mobile terminal.

18. The mobile terminal according to claim 17, wherein the fourth video is obtained while the second video and the third video are displayed on the display.

19. The mobile terminal according to claim 17, wherein the first camera is located on the mobile terminal in such a manner as to capture images of a user of the mobile terminal while the display is visible to the user.

20. The mobile terminal according to claim 17, wherein the mobile terminal has a first display mode and a second display mode which is user selectable, wherein the first display mode comprises displaying the second video on the display; and wherein the second display mode comprises displaying the first video, instead of the second video, on the display.

21. The mobile terminal according to claim 17, wherein the processor is further configured to:

provide relative positioning between the second video and the fourth video responsive to user input.

22. The mobile terminal according to claim 17, wherein at least two of the second video, the third video, or the fourth video are configured to overlap one another.

23. The mobile terminal according to claim 9, wherein the transmitting of the first video and the transmitting of the fourth video occurs while the terminal is in the video call mode.

24. The mobile terminal according to claim 9, wherein the processor is further configured to:

cause change in relative positioning between the displayed second video and the displayed third video in response to an input.

25. The method according to claim 1, wherein the transmitting of the first video and the transmitting of the fourth video occurs while the terminal is in the video call mode.

26. The method according to claim 1, further comprising: changing relative positioning between the displayed second video and the displayed third video in response to an input.

* * * * *